United States Patent [19]

Patterson

[11] Patent Number: 4,993,677
[45] Date of Patent: Feb. 19, 1991

[54] CLAMP-ON SUPPORT LEG FOR TRAILER TONGUES

[76] Inventor: Gary W. Patterson, Belle Vue Trl. Ct. #3, P.O. Box 2533, Polson, Mont. 59860

[21] Appl. No.: 537,436

[22] Filed: Jun. 13, 1990

Related U.S. Application Data

[63] Continuation-in-part of Ser. No. 103,342, Oct. 1, 1987, abandoned.

[51] Int. Cl.⁵ .......................................... F16M 13/00
[52] U.S. Cl. .................................. 248/351; 248/352; 248/688; 280/763.1
[58] Field of Search .............. 248/351, 352, 688, 689, 248/439; 280/1, 763.1; 108/115, 129, 125; 182/206

[56] References Cited

U.S. PATENT DOCUMENTS

| 675,545 | 6/1901 | Hatch | 182/206 X |
|---|---|---|---|
| 2,281,814 | 5/1942 | Willoughby . | |
| 2,714,016 | 7/1955 | Smith . | |
| 2,921,825 | 1/1960 | Spiegel . | |
| 3,529,850 | 9/1970 | Montalto . | |
| 3,814,357 | 6/1974 | Rontgen | 248/573 X |
| 3,879,055 | 4/1975 | Sill et al. . | |
| 4,070,041 | 1/1978 | Brammer | 280/763.1 |
| 4,098,535 | 7/1978 | Berger | 280/763.1 X |
| 4,469,348 | 9/1984 | Crook | 280/763 X |

*Primary Examiner*—David L. Talbott
*Attorney, Agent, or Firm*—Harry M. Cross, Jr.

[57] ABSTRACT

A support leg for trailer tongues which comprises an L-shaped ground support leg having a horizontal portion of square cross-section, a leg mounting bracket having a hollow cylindrical interior capped at one end and open at the other end with a circular cross-section of sufficient diameter to telescopically and rotatively receive the horizontal leg portion and terminating at its closed end in an internal leg-locking cavity of square cross-section, said internal cavity being adapted to telescoping receive said horizontal leg portion and restrain said horizontal leg portion against rotative movement, whereby said horizontal leg portion may be withdrawn from said internal leg locking cavity and rotate in said hollow cylindrical interior from a retracted to an extended position and vice versa and then telescopically inserted back into the internal cavity for locking engagement in the new position, a tension spring to resist telescoping disengagement of said leg horizontal portion from the internal leg locking cavity and a seal associated with the leg and the leg mounting bracket to effect an environmental seal.

5 Claims, 4 Drawing Sheets

CLAMP-ON SUPPORT LEG FOR TRAILER TONGUES

RELATED APPLICATION

This is a continuation-in-part of U.S. application Ser. No. 07/103,342, filed Oct. 1, 1987, now abandoned.

FIELD OF THE INVENTION

This invention relates to trailer tongue support stands and particularly to such stands that may be temporarily installed.

SUMMARY OF THE INVENTION

This is a quick, simple, dependable steel stand for small trailer, wagon, and equipment tongues, or other applications that require a temporary support. This invention embodies a spring loaded, self-locking feature in both support and transport position. The stand of this invention has no exterior pins or latches to pull or turn, and no proturding parts that can be accidentally bumped to unlock the stand, thereby causing collapse and possible injury. The purpose of this invention is to support equipment at a pre-determined height to avoid the strain and pain that comes from lifting them from the ground.

DETAILED DESCRIPTION OF THE INVENTION

Figure 1:
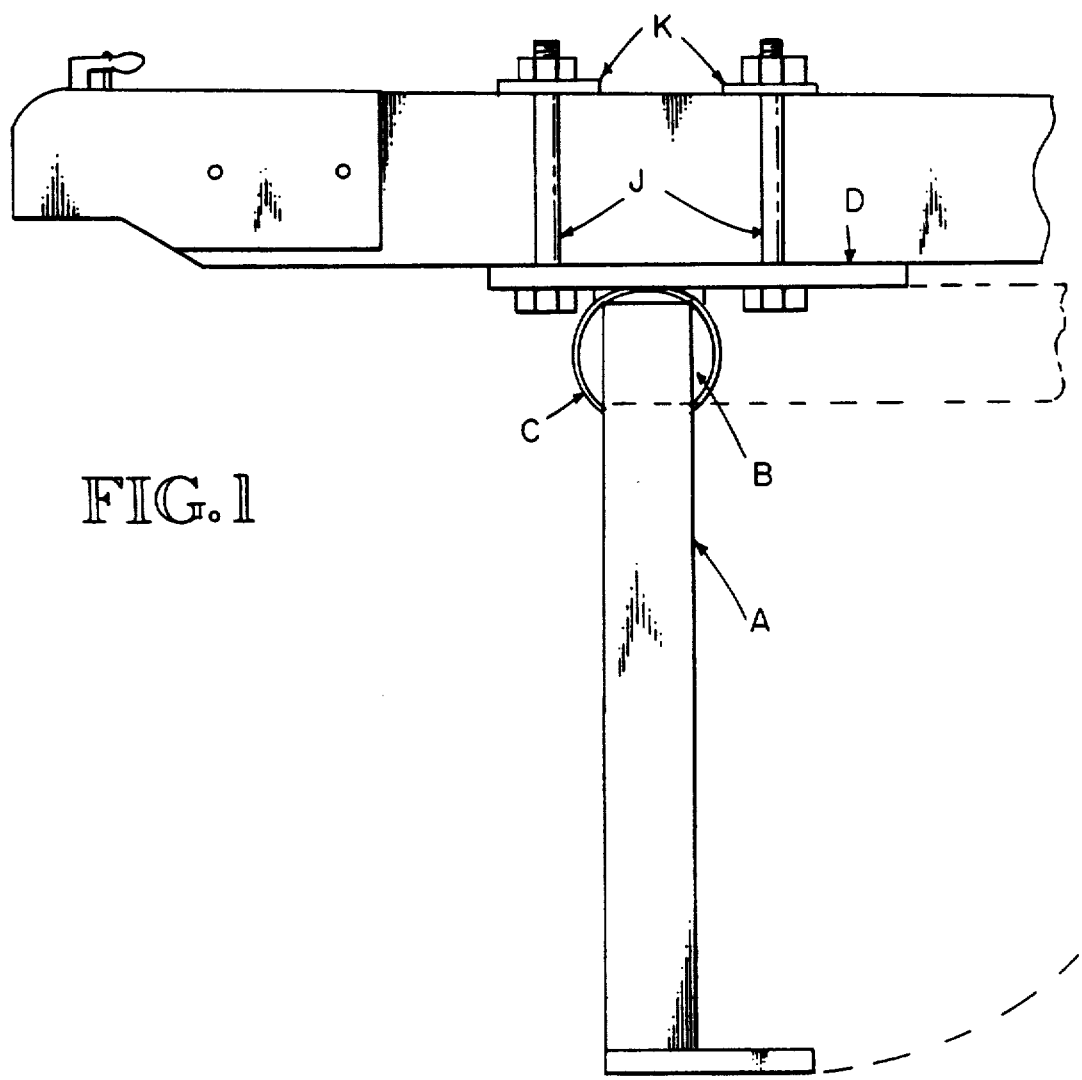
FIG. 1 depicts the stand of this invention mounted on a tongue showing both transport (in dotted line) and support positions.

The support stand of this invention comprises an L-shaped support leg A, an iron cylinder C within which the horizontal portion of the support leg is telescopically fitted, a tongue attachment base D, a tension spring E and restrictor chain F, a leg-locking end tube G with an end cap I, a round B for centering the support leg in the cylinder and for providing a finished look, and spring and chain attaching rivets G. The support leg A is comprised of a vertical section and an horizontal section. The vertical section is cut from 1"×1"×120 tubing appriximately 13⅝" long (determined by desired height) with 45 degree angle cut on the top end. The horizontal section is 1"×1"×120 tubing 5" long with 45 degree angle on one end. These pieces are then welded together to form a 90 degree angle. A peice of ¼"×1" flat steel 3¼" long is then welded to the bottomend of the vertical tubing to complete the support leg.

A 3/16" hole is then drilled 4½" from the outer end of the horizontal section to accomodate the rivet used to attach the spring E and chain F to the interior of the support leg A. The round (B) is then placed over the horizontal section of the support leg to be welded in place at a later time in the assembly procedure. Cylinder C, which is cut from 1¼" heavy wall pipe, is welded to the center of attachment base D making sure it is flush on both ends with base D.

Next, center rivet holder and lock (leg-locking tube G 1¼"×1¼"×1" square tubing) is mounted on one end of cylinder C, making sure one side is parallel to the attachment base D, and welded securely in place. A 3/16" hole is drilled through tubing G ½" from the end to accomodate rivet H. To assemble the stand, a 6⅝" restrictor chain F is slid into the center of a 4" tension spring E and both are inserted into the horizontal section of support leg A. The hole in the end link of chain E and eye of spring F are aligned with the hole in the support leg and a rivet is inserted and secured through the support leg. The horizontal portion of the support leg (with the spring and chain attached) is inserted into the cylinder C. The chain and spring are pulled out and the opposite end link and eye are aligned with the hole in 1¼" tubing G and the rivet H is secured through tubing G. The end cap I is inserted into the end of the 1¼" tubing G and welded in place. The round B is slid tight to cylinder C and welded to the support leg. All components are built from stock steel and over the counter parts except the round washer B with the 1" square hole which is machine stamped from ⅛" sheet steel.

The clamp-on support leg is self-locking, extermely durable, easily operated with one hand, has near unlimited adaptability. The simplicity of design and ease of operation make it a very novel, yet desireable, back-saving option. The locking method of inserting one piece of square tubing into another is a strong but simple way to insure dependability, and avoid accidental collapse and injury. To engage or disengage the support leg A, one just pulls the support leg out from engagement with the tubing G and turn the support leg within the cylinder C. When the support leg has been rotated 90 degrees, it will automatically extend back into tubing G, under the force of tension spring E, and lock itself into the new position. The spring E resists the pull and normally holds the support leg in its locked condition. The restrictor chain F prevents completely removing the support leg from cylinder C and prevents over stretching the tension spring.

It is apparent from the relative dimensions of the parts of this assembly that the interior of cylinder C is closed to the surrounding environment when the support leg A is locked in either position. The rivet holder G and end cap I are sized such that it is readily apparent that when rivet holder G is welded to cylinder C that the circular wall of cylinder C is abutted and, consequently, the interior of cylinder C cannot be exposed at the joint between these two members. Likewise, the dimensions of end cap I and the inner dimensions of rivet holder G are the same and, consequently, when end cap I is welded in place the interior of rivet holder G cannot be exposed at the joint between these two members. Therefore, the interior of the hollow cylindrical interior, composed of the interiors of cylinder C and rivet holder G, is exposed to ambient conditions only through its open end adjacent round B. Cylinder C and rivet holder G compose a mounting member for the support leg A and the interior thereof is capped by end cap I secured to provide a sealed, closed end to the composite interior. This composite member is a mounting means for the support leg A.

Round B, being placed tight to the cylinder and welded in place, seals the interiors of cylinder C and rivet holder G from the surrounding environment when the support leg A is locked in its up and down conditions (that is to say, when the support leg is telescopically engaged in the internal leg-locking cavity provided by the interior of rivet holder G). Therefore, an environment-tight seal is provided to keep the interior of cylinder C and rivet holder G, and spring E, free from contamination so that the inner workings of the assembly can perform in uncontaminated surroundings. The hollow cylindrical interior of the assembly, as is apparent, is closed when the leg is telescopically engaged.

Also to be understood from the relative dimensions of the parts of this assembly, the tension spring E is short enough that it must be stretched during installation and remained stretched, even when the support leg is in telescopic engagement with the internal leg-locking cavity. Consequently, the round B is firmly maintained in sealing contact with the open end of cylinder C when the support leg is locked into its up or down position.

A modified version of the assembly is also possible. For example, cylinder C can be provided of a length equal to the combined lengths of the cylinder and rivet holder thus far described, and a die plug inserted into one end of this longer cylinder and the sides of this cylinder (adjacent the die plug) flattened externally to provide the squared end portion (formerly provided by rivet holder G). The die plug would then be removed to leave a squared off end portion of this longer cylinder. The squared off end portion would then be provided with rivet holes for receiving rivet H during assembly. Thus, the longer cylinder is fashoned at one end to itself provide the internal leg-locking cavity formerly provided by rivet holder G. After the spring is connected, the end cap would then be welded in place to seal off the internal leg-locking cavity.

At its open end, the cylinder C could be flared out to provide a frusto-conical, tapered inner surface, within which the round B could be placed tight and welded in place on the support leg A during assembly. The seal between the open end of the cylinder and round B would thus be somewhat encased by the flared end of the cylinder when the support leg is in telescopic engagement with the internal leg-locking cavity. In this modified version, the round B would still be positioned tight to the cylinder to provide an environment seal.

Figure 2:
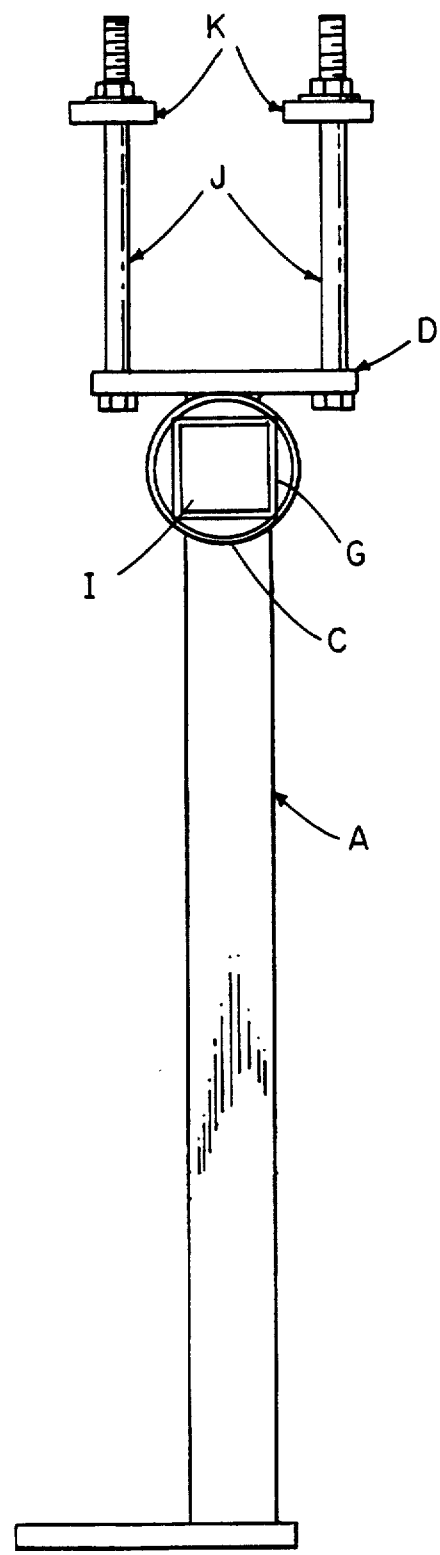
FIG. 2 is a right hand side view of the stand of this invention in the support position showing relative shape and size of parts.
Figure 3:
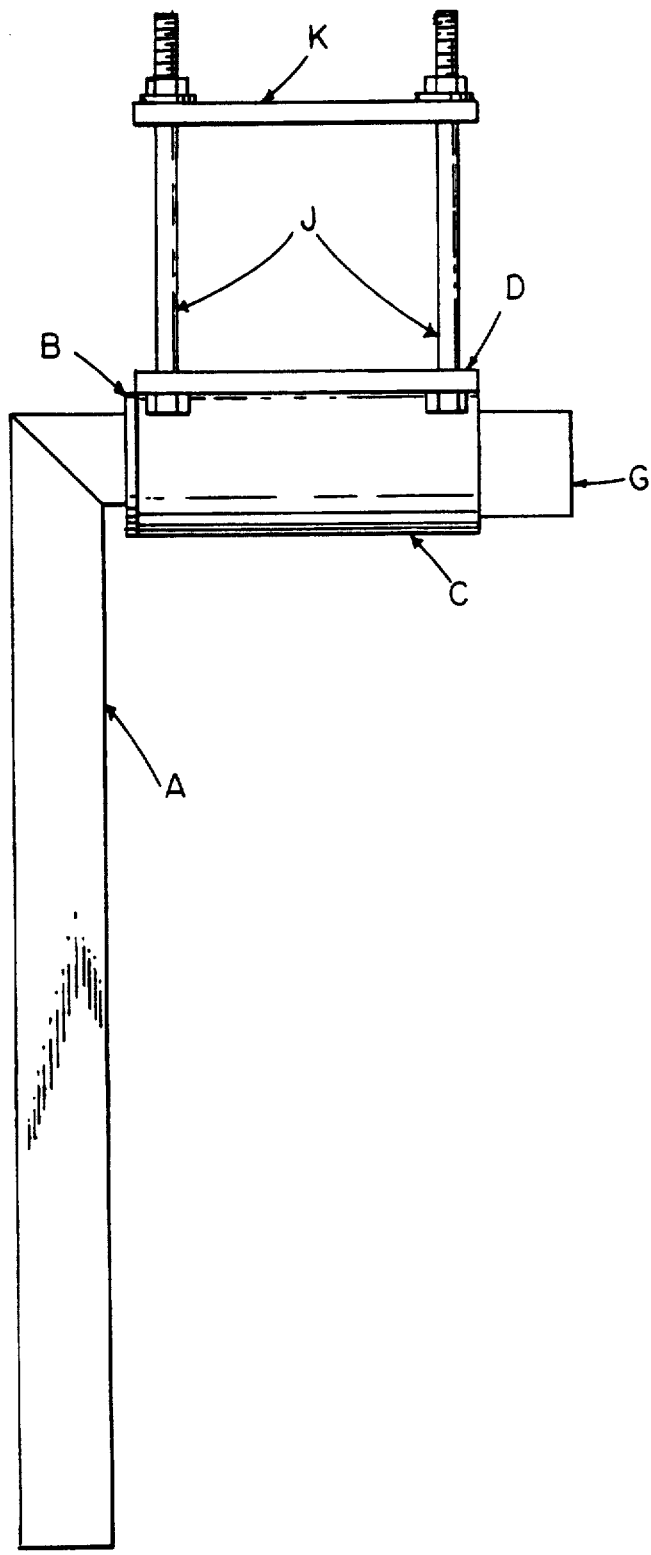
FIG. 3 is a rear view of the stand of this invention in the support position showing relative shape and size of parts.
Figure 4:
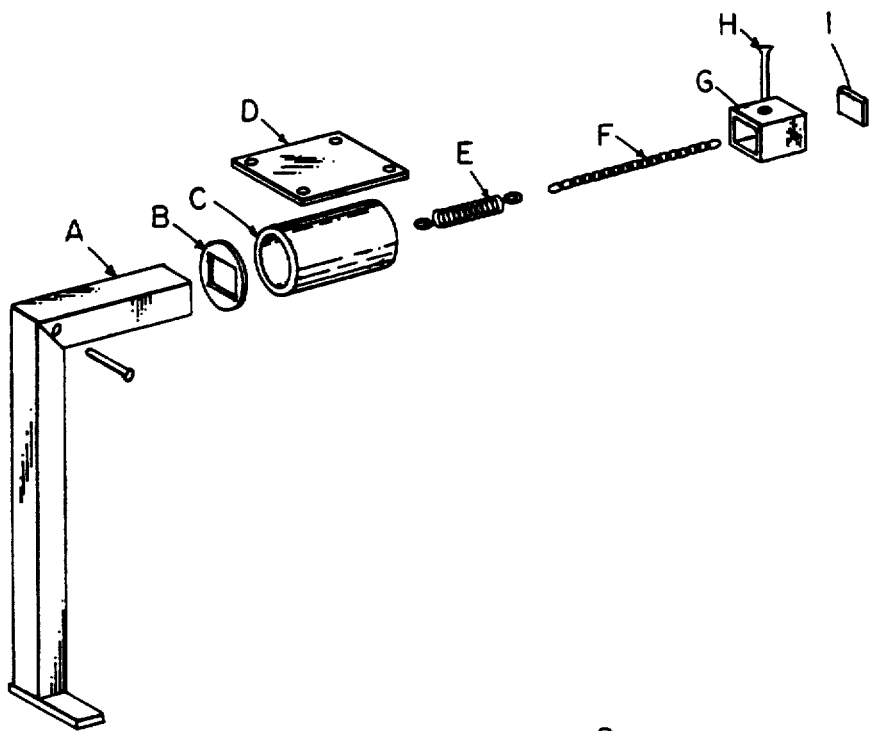
FIG. 4 is an exploded view of the parts and sequence of assembly.
Figure 5:
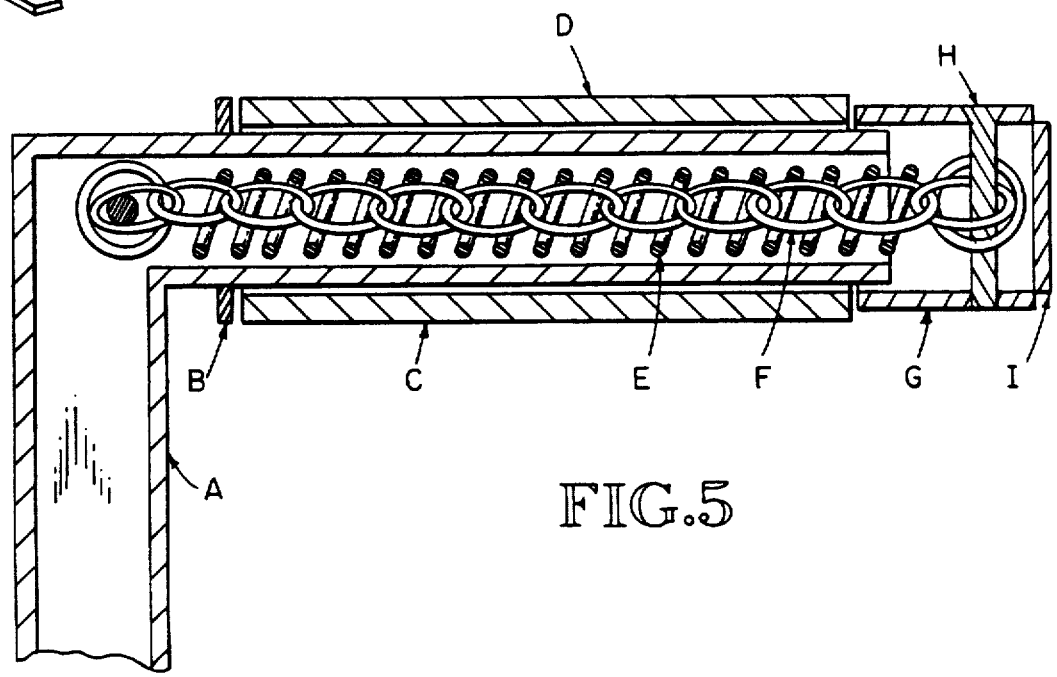
FIG. 5 is a cut-away of the assembled mechanism of this invention showing chain, spring, and locking mechanism.

The support stand of this invention is provided with a bolt clamp assembly to attach the stand's attachment base D to a tongue frame or other framework. This assembly comprises four 5"×¼" bolts J, appropriate nuts and washers, and a pair of ¼"×1"×4" steel plates K. The plates K interconnect forward and rearward bolt pairs as shown in FIGS. 1, 2 and 3. The front-to-rear spacing of the bolts is 3".

The embodiments of the invention in which an exclusive property is claimed are defined as follows:

We claim:

1. A support leg for trailer tongues or the like which comprises an L-shaped ground support leg having a horizontal portion of square cross-section; leg-mounting means adapted to be attached to a device to be supported, said leg-mounting means having a hollow cylindrical interior capped at one end and open at the other end with a circular cross section of sufficient diameter to telescopically and rotatively receive said horizontal leg portion, said hollow cylindrical interior terminating at its closed end in an internal leg-locking cavity of square cross-section, said horizontal leg portion being adapted to be inserted through the open end of said leg-mounting member and to extend through said hollow cylindrical interior into said leg-locking internal cavity, and said internal cavity being adapted to telescopically receive said horizontal leg portion and restrain said horizontal leg portion against rotative movement, whereby said horizontal leg portion may be withdrawn from said internal leg-locking cavity and rotated in said hollow cylindrical interior from a retracted to an extended position and vice versa and then telescopically inserted back into said internal cavity for locking engagement in the new position; said leg-mounting means being so constructed that said hollow cylindrical interior, including said internal leg-locking cavity at the closed end thereof, is exposed to ambient surroundings only through its open end; tension means located within said leg horizontal member and extending therein to within said internal leg-locking cavity and fastened at its ends inside said leg horizontal portion and said leg-locking cavity to resist telescoping disengagement of said leg horizontal portion from said internal leg-locking cavity; and means associated with said leg and said leg-mounting means to effect a closure between them at the open end of said hollow cylindrical interior when said leg is telescopically engaged in said internal leg-locking cavity.

2. The support leg of claim 1 wherein said means associated with said leg and said leg mounting means is provided as a round collar fastened to the exterior of said leg horizontal portion immediately adjacent the open end of said hollow cylindrical interior of said leg-mounting means.

3. The support leg of claim 1 wherein restrictor means is fastened within said leg horizontal member and said leg-locking cavity along side said tension means to limit the extent telescopic movement of said leg horizontal portion to only that necessary to clear said internal leg-locking cavity.

4. A support leg for trailer tongues or the like which comprises an L-shaped ground support leg having a horizontal portion of square cross-section; leg-mounting means adapted to be attached to a device to be supported, said leg-mounting means having a hollow cylindrical interior capped at one end and open at the other end with a circular cross section of sufficient diameter to telescopically and rotatively receive said horizontal leg portion, said hollow cylindrical interior terminating at its closed end in an internal leg-locking cavity of square cross-section, said horizontal leg portion being adapted to be inserted through the open end of said leg-mounting member and to extend through said hollow cylindrical interior into said leg-locking internal cavity, and said internal cavity being adapted to telescopically receive said horizontal leg portion and restrain said horizontal leg portion against rotative movement, whereby said horizontal leg portion may be withdrawn from said internal leg-locking cavity and rotated in said hollow cylindrical interior from a retracted to an extended position and vice versa and then telescopically inserted back into said internal cavity for locking engagement in the new position; said leg-mounting means being so constructed that said hollow cylindrical interior, including said internal leg-locking cavity at the closed end thereof, is exposed to ambient surroundings only through its open end; tension means located within said leg horizontal member and extending therein to within said internal leg-locking cavity and fastened at its ends inside said leg horizontal portion and said leg-locking cavity to resist telescoping disengagement of said leg horizontal portion from said internal leg-locking cavity; means associated with said leg and said leg-mounting means to effect a closure between them at the open end of said hollow cylindrical interior when said leg is telescopically engaged in said internal leg-locking cavity, said means being provided as a round collar fastened to the exterior of said leg horizontal portion immediately adjacent the open end of said hollow cylindrical interior of said leg-mounting means; and restrictor means fastened within said leg horizontal member and said leg-locking cavity alongside said tension means to limit the extent telescopic movement of said leg horizontal portion to only that necessary to clear said internal leg-locking cavity.

5. The support leg of claim 4 wherein said leg-mounting means comprises an elongated cylinder providing said hollow cylindrical interior, a short tube attached at one end to one end of said elongated cylinder and providing said internal leg-locking cavity, and an end cap attached to the outer end of said short tube to close off said internal leg-locking cavity at the capped end of said hollow cylindrical interior.

* * * * *